(12) United States Patent
Yang et al.

(10) Patent No.: US 12,117,661 B2
(45) Date of Patent: Oct. 15, 2024

(54) PHOTONIC INTEGRATED CIRCUIT CHIP

(71) Applicant: Molex, LLC, Lisle, IL (US)

(72) Inventors: Li-Chi Yang, Hsinchu (TW); Bing-Hao Shih, Changhua (TW); Chih-Chung Wu, Hsinchu (TW); Zuon-Min Chuang, Taoyuan (TW)

(73) Assignee: Molex, LLC, Lisle, IL (US)

( * ) Notice: Subject to any disclaimer, the term of this patent is extended or adjusted under 35 U.S.C. 154(b) by 595 days.

(21) Appl. No.: 17/466,081

(22) Filed: Sep. 3, 2021

(65) Prior Publication Data

US 2022/0082770 A1    Mar. 17, 2022

(30) Foreign Application Priority Data

Sep. 17, 2020   (CN) .......................... 202010978753.5

(51) Int. Cl.
*G02B 6/42* (2006.01)
*G02B 6/43* (2006.01)
(Continued)

(52) U.S. Cl.
CPC ......... *G02B 6/4246* (2013.01); *G02B 6/4213* (2013.01); *G02B 6/43* (2013.01);
(Continued)

(58) Field of Classification Search
CPC .. G02B 6/3502; G02B 6/3546; G02B 6/4246; G02B 6/4213; G02B 6/43; G02B 6/4215; G02B 6/12; G02B 6/12004; G02B 6/12007; H04Q 1/147; H04Q 11/0003; H04B 10/25891; H04B 10/40; H04J 14/02; H04J 14/06

See application file for complete search history.

(56) References Cited

U.S. PATENT DOCUMENTS

2018/0341062 A1   11/2018   Melikyan
2020/0083959 A1   3/2020    Mack et al.

FOREIGN PATENT DOCUMENTS

CN    1997924 A        7/2007
CN    101729149 A  *   6/2010   ......... H04B 10/5165
(Continued)

*Primary Examiner* — Leslie C Pascal

(57) ABSTRACT

The present disclosure provides a photonic integrated circuit chip. The photonic integrated circuit chip comprises a plurality of connection ports, multiple polarization beam splitting structures, a photodetector structure, an interleaver and a modulator. The plurality of connection ports are used to receive a plurality of first optical signals to the photonic integrated circuit chip. The multiple polarization beam splitting structures each are used to split the first optical signal passing through the polarization beam splitting structure into a first mode optical signal and a second mode optical signal. The photodetector structure comprises a first component for split beam and a second component for split beam. The interleaver is used to transfer the first mode optical signal or the second mode optical signal to the second component for split beam. The modulator is used to transfer second optical signals with different wavelengths to the interleaver. The interleaver further transfers the second optical signals to the different connection ports according to the different wavelengths of the second optical signals.

20 Claims, 9 Drawing Sheets

(51) Int. Cl.
*H04B 10/25* (2013.01)
*H04B 10/40* (2013.01)
*H04J 14/02* (2006.01)
*H04J 14/06* (2006.01)

(52) U.S. Cl.
CPC ....... *H04B 10/25891* (2020.05); *H04B 10/40* (2013.01); *H04J 14/02* (2013.01); *H04J 14/06* (2013.01)

(56) References Cited

FOREIGN PATENT DOCUMENTS

| | | |
|---|---|---|
| CN | 104301041 A | 1/2015 |
| CN | 104391361 A | 3/2015 |
| CN | 109906393 A | 6/2019 |
| EP | 3507630 A1 | 7/2019 |

\* cited by examiner

PHOTONIC INTEGRATED CIRCUIT CHIP

RELATED APPLICATIONS

The present application claims priority to Chinese Patent Application No. 202010978753.5 filed Sep. 17, 2020, which is incorporated by reference in its entirety.

TECHNICAL FIELD

An embodiment of the present disclosure relates to a photonic integrated circuit chip, and particularly relates to a photonic integrated circuit chip which integrates a duplex architecture and a single optical fiber bidirectional (BiDi) architecture into a single universal chip.

BACKGROUND ART

In modern high-speed communication networks, for example, at nodes such as cloud-end centers and user ends, optical transceivers are generally provided in electronic communication devices. By using optical fibers and optical transceivers, an information transfer manner having advantages, such as high frequency bandwidth, long distance, low loss, no crosstalk and the like, can be realized.

In a structure of a general optical transceiver, the optical transceiver may have an electrical/optical signal conversion optical transmitting module which converts electrical signal into a corresponding optical signal and transmit the data through an optical fiber as a transferring medium; another module is an optical/electrical signal conversion optical receiving module which converts the optical signal received from the optical fiber into an electrical signal. Furthermore, in some application modes, bidirectional data transference may be performed based on a single optical fiber, while in certain application modes, two optical fibers are used to perform the duplex function of uploading data and downloading data respectively. However, such two application modes use different optical transceivers, that is, such two application modes each are an independent application, therefore, when confronting evolution of a communication transferring device toward miniaturization and universalization, if different optical transceivers are intended to be used to make communication transferring device have both of such two application modes, it is difficult in volume reduction, manufacturing cost, etc. al, and does not meet market requirements, which hinders the further popularization and expansion of related technical fields.

The above description of the "background" merely provides a background, and it is not admitted that the above description of "background" discloses the subject matter of the present disclosure, and the above description of "background" does not constitute the background of the present disclosure, any above description of the "background" should not be considered as any part of the present disclosure.

SUMMARY

An embodiment of the present disclosure provides a photonic integrated circuit chip. The photonic integrated circuit chip comprises a plurality of connection ports, multiple polarization beam splitting structures, a photodetector structure, an interleaver and a modulator. The plurality of connection ports are used to receive a plurality of first optical signals to the photonic integrated circuit chip. The multiple polarization beam splitting structures each are optically coupled to the corresponding connection port, and each are used to split the first optical signal passing through the polarization beam splitting structure into a first mode optical signal and a second mode optical signal. The photodetector structure comprises a first component for split beam and a second component for split beam respectively optically coupled to the multiple polarization beam splitting structures. The interleaver is optically coupled to the second component for split beam and is used to transfer the first mode optical signal or the second mode optical signal to the second component for split beam of the photodetector structure. The modulator is optically coupled to the interleaver and is used to transfer second optical signals with different wavelengths to the interleaver. The interleaver further transfers the second optical signals to the different connection ports according to the different wavelengths of the second optical signals.

In some embodiments, the photonic integrated circuit chip further comprises a light source connection port which is optically coupled to the modulator and is used to be coupled to a light source.

In some embodiments, the light source is used to provide lights with different wavelengths to the modulator to form the second optical signals.

In some embodiments, wherein the plurality of connection ports comprises: a first connection port which is coupled to a first optical fiber; a second connection port which is coupled to a second optical fiber; a third connection port which is coupled to a third optical fiber; and a fourth connection port which is coupled to a fourth optical fiber.

In some embodiments, the first component for split beam and the second component for split beam are respectively positioned at two corresponding ends of the photodetector structure, and the first component for split beam is optically coupled to the first connection port, the second component for split beam is further optically coupled to the third connection port and the fourth connection port.

In some embodiments, the first component for split beam has a 1×2 multimode interference optical coupling structure.

In some embodiments, the second component for split beam has a 1×3 multimode interference optical coupling structure.

In some embodiments, the multiple polarization beam splitting structures, the photodetector structure, the interleaver and the modulator are fabricated by a CMOS process.

In some embodiments, the interleaver has a wavelength division multiplexing structure.

In some embodiments, the interleaver has a silicon-based filter structure with a thickness of about 200-300 nm.

In some embodiments, the photonic integrated circuit chip further comprises multiple polarization rotator structures which are optically coupled to the multiple polarization beam splitting structures respectively and which each are used to rotate the first mode optical signal to have the same mode as the second mode optical signal.

Another embodiment of the present disclosure provides a photonic integrated circuit chip. The photonic integrated circuit chip comprises five connection ports, multiple polarization beam splitting structures, at least one photodetector structure, an interleaver and a modulator. The five connection ports are used to be coupled to four optical fibers to receive or transmit optical signals to the photonic integrated circuit chip and are used to be coupled to a light source to transmit a light from the light source to the photonic integrated circuit chip. The multiple polarization beam splitting structures are optically coupled to the optical fibers via the connection ports. The at least one photodetector structure is optically coupled to the multiple polarization beam splitting structures. The interleaver is optically coupled to the photodetector structure. The modulator is optically coupled to the interleaver and is optically coupled to the light source via the connection port.

In some embodiments, the photonic integrated circuit chip further comprises multiple polarization rotating structures which are optically coupled to the multiple polarization beam splitting structures respectively.

In some embodiments, when the at least one photodetector structure comprises a single photodetector structure, the photodetector structure comprises at least two component for split beams, and the component for split beams are optically coupled to the multiple polarization beam splitting structures.

In some embodiments, when the at least one photodetector structure comprises photodetector structures, the photodetector structures each comprise a component for split beam, and the component for split beam is optically coupled to the corresponding polarization component for split beam structure.

In some embodiments, the component for split beams each have a onexmultiple multimode interference optical coupling structure.

In some embodiments, the five connection ports comprises two connection ports which each are used to be coupled to the corresponding optical fiber for bidirectional transference.

In some embodiments, the interleaver comprises at least three ports which are respectively used to receive an optical signal from one of the multiple polarization beam splitting structures, transmit the optical signal to the photodetector structure and receive an optical signal from the modulator.

Still another embodiment of the present disclosure provides a photonic integrated circuit chip. The photonic integrated circuit chip comprises a connection port, a polarization beam splitting structure, an interleaver and a modulator. The connection port is coupled to an optical fiber for bidirectional transference. The polarization beam splitting structure is optically coupled to the connection port, receives an optical receiving signal from the optical fiber via the connection port, and is used to split the optical receiving signal into a first mode optical receiving signal and a second mode optical receiving signal. The interleaver has a wavelength division multiplexing structure, is optically coupled to the polarization beam splitting structure, and receives the first mode optical receiving signal or the second mode optical receiving signal. The modulator is optically coupled to the interleaver and transmits an optical transmitting signal to the interleaver, the optical transmitting signal and the first mode optical receiving signal or the second mode optical receiving signal received by the interleaver have different wavelengths and the same mode.

In some embodiments, the photonic integrated circuit chip further comprises a polarization rotator structure which is optically coupled to the polarization beam splitting structure and is used to rotate the second mode optical receiving signal to have the same mode as the first mode optical receiving signal.

In some embodiments, the photonic integrated circuit chip further comprises a light source which is optically coupled to the modulator and is used to provide lights with different wavelengths to the modulator to form the optical transmitting signals with the different wavelengths.

The technical features and advantages of the present disclosure are widely and generally described as above, so the following detailed description of the present disclosure can be better understood. Other technical features and advantages constituting the subject matters of the claims of the present disclosure will be described below. It is to be understood by those of ordinary skill in the art that, the concept and specific embodiments disclosed below herein may be quite easily used to modify or design other structure or process to realize the same object as the present disclosure. It is to be understood by those of ordinary skill in the art that these equivalent configurations cannot depart from the spirit and scope of the present disclosure as defined by the appended claims.

BRIEF DESCRIPTION OF THE DRAWINGS

Referring to the detailed description and the claims in combination with the drawings, the disclosed contents of the present disclosure can be fully understood, the same reference numeral indicates the same element in the drawings.

DETAILED DESCRIPTION OF THE PREFERRED EMBODIMENTS

Figure 1:
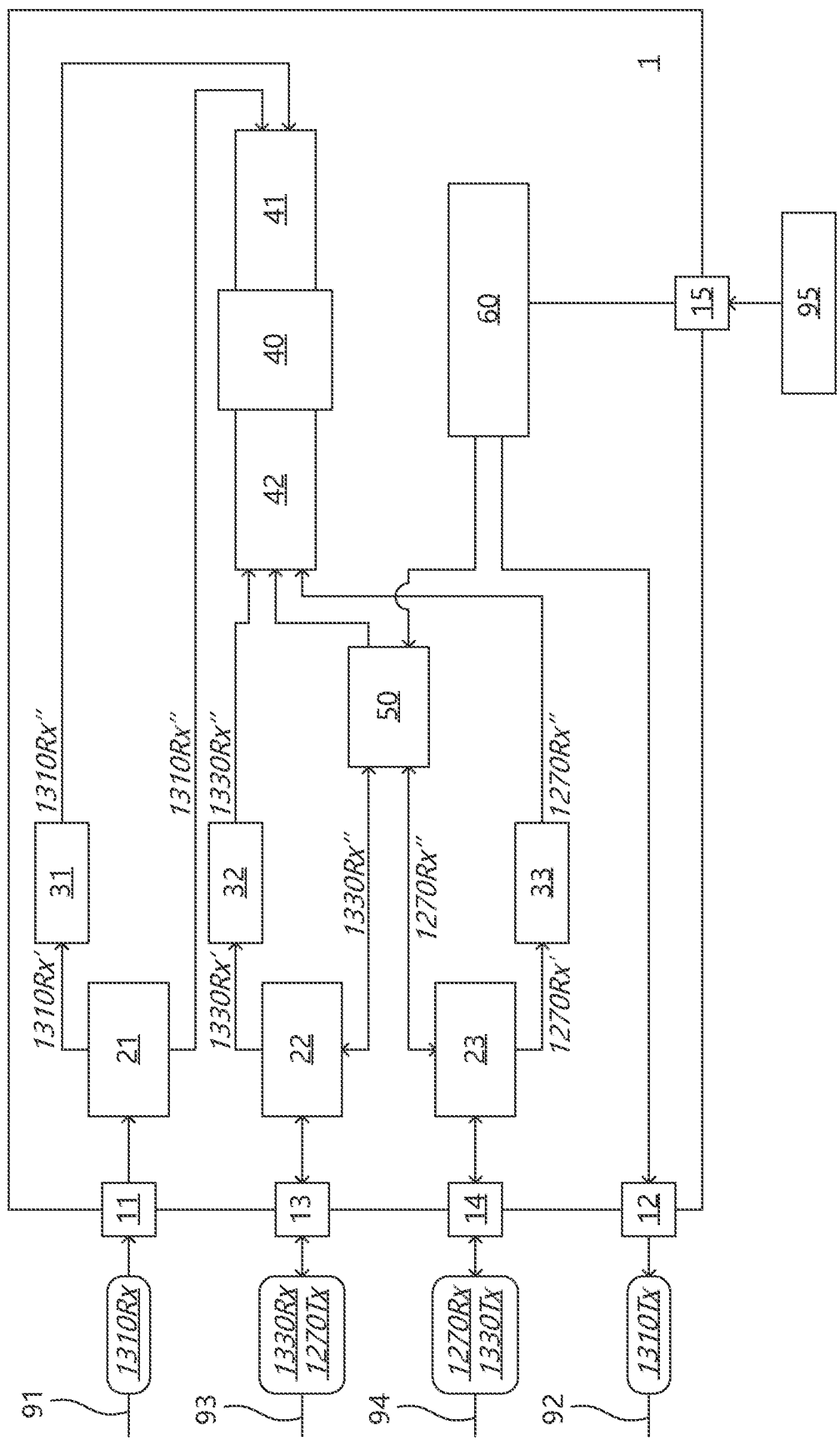
FIG. 1 is a schematic diagram of an architecture of a photonic integrated circuit chip according to an embodiment of the present disclosure.

Embodiments or examples of the content of the present disclosure shown in the drawings are described in a specific language. It is to be understood that this is not intended to limit the scope of the present disclosure. Any variations or modifications of the described embodiments, as well as any further applications of the principles described herein, will normally occur to those skilled in the art. The reference numerals may be repeated in each embodiment, but even if the elements have the same reference numeral, the features in the embodiment are not necessarily used in another embodiment.

It will be understood that the various elements, assemblies, regions, layers or sections may be described herein using the terms first, second, third, etc., however, these elements, assemblies, regions, layers or sections are not limited to these terms. These terms are only used to distinguish one element, assembly, region, layer or section from another element, assembly, region, layer or section. The first element, assembly, region, layer or section described below may be referred to as a second element, assembly, region, layer or section without departing from the teachings of the inventive concept of the present disclosure.

The words used in the present disclosure are only used for the purpose of describing the specific exemplary embodiments and are not intended to limit the concept of the present disclosure. As used herein, "a/an" and "the" in singular are also used to contain plural, unless otherwise expressly indicated herein. It is to be understood that the word "include" used in the specification specifically indicates the existence of a feature, integer, step, operation, element or assembly which is described, but does not excludes the existence of one or more other features, integers, steps, operations, elements, assemblies or groups thereof.

FIG. 1 is a schematic diagram of an architecture of a photonic integrated circuit chip 1 of the present disclosure. As shown in the figure, the photonic integrated circuit chip 1 may include a plurality of connection ports 11, 12, 13, 14 which can be used to connect multiple optical paths to enter into and exit from the photonic integrated circuit chip 1. Specifically, in some embodiments, the photonic integrated circuit chip 1 includes a first connection port 11 and a second connection port 12 which are respectively used to receive an optical signal to enter into the photonic integrated circuit chip 1 and transmit an optical signal to exit from the photonic integrated circuit chip 1. For example, the first connection port 11 and the second connection port 12 may be respectively coupled to a first optical fiber 91 and a second optical fiber 92 so as to receive an optical signal from the first optical fiber 91 and transmit an optical signal to the second optical fiber 92 respectively. The first optical fiber 91 and the second optical fiber 92 each are used for unidirectional transference which only provides one transference mode, for example, only transfers a light with a wavelength of 1310 nm or 1550 nm, so it realizes that the photonic integrated circuit chip 1 can be coupled to two optical fibers and has a duplex function. In some embodiments, the present disclosure can receive an optical receiving signal 1310Rx with a wavelength of 1310 nm via the first optical fiber 91 connected to the first connection port 11, and transmit an optical receiving signal 1310Rx with a wavelength of 1310 nm via the second optical fiber 92 connected to the second connection port 12.

In some embodiments of the present disclosure, the photonic integrated circuit chip 1 may include a third connection port 13 which is coupled to a third optical fiber 93 and is used to receive an optical signal from the third optical fiber 93 and transmit an optical signal to the same third optical fiber 93. The third optical fiber 93 is used for bidirectional transference, the bidirectional transference is characterized in that, under a condition of using a single physical optical fiber, it can achieve a single optical fiber bidirectional (BiDi) purpose that can receive an optical signal and transmit an optical signal at the same time, and so it needs to use lights with different wavelengths (for example, use combinations such as 1330 nm/1270 nm, 1510 nm/1310 nm or 850 nm/1310 nm and the like) to receive an optical signal and transmit an optical signal respectively For example, as shown in FIG. 1, the present disclosure can receive an optical receiving signal 1330Rx with a wavelength of 1330 nm via the third optical fiber 93 connected to the third connection port 13 and transmit an optical transmitting signal 1270Tx with a wavelength of 1270 nm via the same third optical fiber 93.

In some embodiments of the present disclosure, the photonic integrated circuit chip 1 may include a fourth connection port 14 which is coupled to a fourth optical fiber 94 and is used to receive an optical signal from the fourth optical fiber 94 and transmit an optical signal to the same fourth optical fiber 94. An application mode of the fourth optical fiber 94 is the same as that of the third optical fiber 93. Since the photonic integrated circuit chip 1 of the present disclosure can be applied to a communication device at a user end and a communication device at a server end in a communication architecture, when the user end and the server end each have the photonic integrated circuit chip 1, for an upstream data transference mode from the user end to the server end, the present disclosure can receive an optical receiving signal 1330Rx with a wavelength of 1330 nm via the third optical fiber 93 connected to the third connection port 13 and transmit an optical transmitting signal 1270Tx with a wavelength of 1270 nm via the same third optical fiber 93. Therefore, corresponding to this, for the server end in the communication architecture, an optical signal received by the server end should have a wavelength of 1270 nm, and an optical signal transmitted by the server end and received by the user end should have a wavelength of 1330 nm, therefore, for a downstream data transference mode from the server end to the user end, the present disclosure needs to receive an optical receiving signal 1270Rx with a wavelength of 1270 nm via the fourth optical fiber 94 coupled to the fourth connection port 14 and transmit an optical transmitting signal 1330Tx with a wavelength of 1330 nm via the same fourth optical fiber 94. In a word, the present disclosure utilizes the third connection port 13 and the fourth connection port 14 to realize optical transceiver elements traditionally deployed in pairs on the user end and the server end.

In some embodiments, the photonic integrated circuit chip 1 may include multiple polarization beam splitting structures 21, 22, 23 which are optically coupled to the first connection port 11, the third connection port 13 and the fourth connection port 14 respectively and which each are used to split a beam passing through the polarization beam splitting structure 21, 22, 23 into a first mode optical signal and a second mode optical signal. Specifically, when the photonic integrated circuit chip 1 receives abeam, considering the polarization problem in the transference process of the communication architecture using an optical fiber as a medium, for example, after long-distance transference, the optical signal has a TE (Transverse Electronic) polarization (or referred to as a transverse electric field mode (TE mode)) and a TM (Transverse Magnetic) polarization (or referred to as a transverse magnetic field mode (TM mode)) at the same time. When speeds of different polarized lights waveguide transferred in the photonic integrated circuit chip 1 are different, if the design is not good, it will cause the optical signal to be received at a different time when passing through a longer waveguide, resulting in a phase difference and increase in the bit error rate. Therefore, in some embodiments of the present disclosure, the transverse magnetic field mode and the transverse electric field mode of each of the aforementioned optical receiving signals 1310Rx, 1330Rx and 1270Rx with specific wavelengths may be split first and the split different polarized lights follow different optical paths to travel in the photonic integrated circuit chip 1, so that reaching times of the different polarized lights to a receiver is consistent.

In some embodiments, the photonic integrated circuit chip 1 may include multiple polarization rotator (PR) structures 31, 32, 33 which are optically coupled to the polarization beam splitting structures 21, 22, 23 respectively and which each are used to rotate one of a first mode optical signal and a second mode optical signal split by the corresponding polarization beam splitting structure 21, 22, 23 into the other of the first mode optical signal and a second mode optical signal. For example, as shown in FIG. 1, the optical receiving signal 1310Rx with the wavelength of 1310 nm received via the first connection port 11 can be split into a transverse magnetic field mode optical receiving signal 1310Rx' and a transverse electric field mode optical receiving signal 1310Rx" (the wavelengths thereof are not changed and the wavelengths of the names thereof are omitted, the same below) by the polarization beam splitting structure 21, the transverse magnetic field mode optical receiving signal 1310Rx' passes through the polarization rotator structure 31 and is rotated into the transverse electric field mode optical receiving signal 1310Rx", that is, it is equivalent to the transverse electric field mode optical receiving signal 1310Rx" which is split by the polarization beam splitting structure 21 and is not processed by the polarization rotator structure 31. So that, when the optical receiving signal 1310Rx originally containing the transverse magnetic field mode and the transverse electric field mode is actually detected by the photonic integrated circuit chip 1, transference times of the different polarized lights to the receiver is the same, or have better optical signal phases. When a required length of the waveguide is long or it is not easy to address the polarization problem by designing different optical paths, the polarization rotation can be used to optimize the design. In some other embodiments, conversely, the polarization rotator structures 31, 32, 33 each can rotate the transverse electric field mode of an optical signal into the transverse magnetic field mode of the optical signal. On the whole, some embodiments of the present disclosure use a combination of the polarization beam splitting structures 21, 22, 23 and the polarization rotator structures 31, 32, 33, a purpose of which is to make the modes of the optical signals consistent without being limited as rotation to transverse magnetic field mode or transverse electric field mode.

In some embodiments, the photonic integrated circuit chip 1 may include a photodetector (PD) structure 40 which is used to detect an optical signal entering into the photonic integrated circuit chip 1. In some embodiments, the photodetector structure 40 includes a first component for split beam 41 which is optically coupled to the polarization beam splitting structure 21, and includes a second component for split beam 42 which is optically coupled to the polarization beam splitting structures 22, 23. In the above embodiments, the first component for split beam 41 and the second component for split beam 42 are used to receive the polarized lights split by the polarization beam splitting structures 21, 22, 23. And as disclosed in the aforementioned embodiments, some split polarized lights will be further rotated by the polarization rotating structures 31, 32, 33. Therefore, in some embodiments, the optical signals received by the first component for split beam 41 and the second component for split beam 42 have the same polarization properties respectively, for example, all the optical signals are transverse electric field modes or all the optical signals are transverse magnetic field modes.

In some embodiments, the first component for split beam 41 and the second component for split beam 42 are respectively positioned at corresponding two ends of the photodetector structure 40, or depending on a specific structural feature of the photodetector structure 40, are positioned at two different detection ends of the photodetector structure 40.

In some embodiments, the first component for split beam 41 has a 1×2 multimode interference (1×2 MMI) optical coupling structure which recouples the transverse electric field mode optical receiving signal 1310Rx" from the polarization beam splitting structure 21 and the transverse electric field mode optical receiving signal 1310Rx" generated by rotating the transverse magnetic field mode optical receiving signal 1310Rx' through the polarization rotator structure 31 into the optical receiving signal 1310Rx with the wavelength of 1310 nm. The coupled optical receiving signal 1310Rx with the wavelength of 1310 nm contains all the different polarized lights, so the loss is reduced, the intensity is higher, or the signal quality may be better. In some embodiments, the first component for split beam 41 is used to realize a function that the photonic integrated circuit chip 1 receives the signal from the first optical fiber 91, the first component for split beam 41 is one of specific features of the duplex architecture included in the present disclosure.

The first component for split beam 41 and the photodetector structure 40 are paths for receiving optical signals in the duplex architecture. Differently, the second component for split beam 42 is used to realize a function that the photonic integrated circuit chip 1 receives the signals from the third optical fiber 93 and the fourth optical fiber 94, the second component for split beam 42 is one of specific features of the single optical fiber bidirectional (BiDi) architecture. In some embodiments, the second component for split beam 42 has a 1×3 multimode interference (1×3 MMI) optical coupling structure. In the upstream data transference mode, the second component for split beam 42 can recouple the transverse electric field mode optical receiving signal 1330Rx" from the polarization beam splitting structure 22 and the transverse electric field mode optical receiving signal 1330Rx" generated by rotating the transverse electric field mode optical receiving signal 1330Rx' through the polarization rotator structure 32 into the optical receiving signal 1330Rx with the wavelength of 1330 nm. In the downstream data transference mode, the second component for split beam 42 can recouple the transverse electric field mode optical receiving signal 1270Rx" from the polarization beam splitting structure 23 and the transverse electric field mode optical receiving signal 1270Rx" generated by rotating the transverse electric field mode optical receiving signal 1270Rx' through the polarization rotator structure 33 into the optical receiving signal 1270Rx with the wavelength of 1270 nm. In the above embodiments, the coupled optical receiving signals 1330Rx and 1270Rx with the specific wavelengths each contain all the different polarized lights, and thus have higher intensity, or can be called to have better signal quality.

In some embodiments, the first component for split beam 41 and the second component for split beam 42 each may have a one×multiple multi-mode interference optical coupling structure (for example, 1×N MMI, 1×M MMI, where N is a natural number greater than 2, and M is a natural number greater than 3), which can further expand the number of ports to be used based on the photonic integrated circuit chip 1 of the present disclosure, thus the first component for split beam 41 and the second component for split beam 42 can receive more optical signals, couple more transverse electric field mode optical signals or the transverse magnetic field mode optical signals into a single component for split beam according to the actually used wavelength, so as to allow the photodetector structure 40 to concentratedly detect.

In the aforementioned embodiments, the photonic integrated circuit chip 1 may include a single photodetector structure 40; in other embodiments, the photonic integrated circuit chip 1 may include a plurality of photodetector structures 40, for example, the photonic integrated circuit chip 1 may include two photodetector structures 40 which each have the first component for split beam 41 and second component for split beam 42 and which are used to detect optical signals of the duplex architecture and optical signals of the single optical fiber bidirectional (BiDi) architecture respectively.

As shown in the architecture of FIG. 1, in some embodiments, the transverse electric field mode optical receiving signal 1330Rx" split by the polarizing beam splitting structure 22 and the transverse electric field mode optical receiving signal 1270Rx" split by the polarizing beam splitting structure 23 share one of optical coupling paths of the second component for split beam 42, which is achieved by an interleaver (ITL) 50 optically coupled to the second component for split beam 42. In some embodiments, interleaver 50 has a wavelength division multiplexing (WDM) structure which may divide optical signals with different wavelengths, or may be couple optical signals with different wavelengths to a specific optical path based on reversibility of lights, so that specific features of a single optical fiber bidirectional (BiDi) architecture in the present disclosure can meet management of the upstream data transference mode and the downstream data transference mode. In some embodiments, the interleaver 50 is a 2×2 interleaver, one end of the interleaver 50 has two ports which are optically coupled to the polarization beam splitting structures 22, 23 respectively and are used to receive an optical signal in the upstream data transference mode and an optical signal in the downstream data transference mode respectively or transmit optical signals to the polarization beam splitting structures 22, 23 respectively; the other end of the interleaver 50 also has two ports which are respectively used to transmit the optical signals to the second component for split beam 42 of the photodetector structure 40 and receive an optical signal that data to be transmitted toward the exterior by the photonic integrated circuit chip 1 of the present disclosure (the optical signal transmitted toward the exterior by the photonic integrated circuit chip 1 will be described later).

In some embodiments, the interleaver 50 having the wavelength division multiplexing structure includes a silicon-based filter structure, for example, can allow an optical signal with a specific wavelength to pass through and reflect an optical signal with another specific wavelength, and has a feature of reversible operation. Because the optical elements of the present disclosure are integrated into a single chip through a CMOS process, a thinning and miniaturized design of the elements allows the photonic integrated circuit chip to have a better speed to read an optical signal and generate an optical signal, in some embodiments, since a waveguide structure used by the silicon-based filter structure of the interleaver 50 has a thickness (200-300 nm) which is more common in the industry, the silicon-based filter structure is more sensitive to the polarization state of the optical signal, so the beam splitting structure used in the present disclosure is designed with respect to the same polarized lights to achieve a better beam splitting effect or reduce loss, so as to ensure the receiving quality of the optical signals.

In some embodiments, the photonic integrated circuit chip 1 includes a light source connection port 15 which is used to communicate with a light source 95. The light source 95 may be a laser diode (LD) or a light emitting diode, and is used to provide a light with a specific wavelength (for example, a laser) from the exterior of the photonic integrated circuit chip 1 to the interior of the photonic integrated circuit chip 1. As previously mentioned, the present disclosure may transmit the optical transmitting signal 1310Tx with the wavelength of 1310 nm via the second optical fiber 92, the optical transmitting signal 1270Tx with the wavelength of 1270 nm via the third optical fiber 93, or the optical transmitting signal 1330Tx with the wavelength of 1330 nm via the fourth optical fiber 94, and these optical signals are lasers with the specific wavelengths generated by the light source 95, such as the laser with the wavelength of 1310 nm, 1270 nm or 1330 nm, and these optical signals carry information after further modulation.

In some embodiments, the photonic integrated circuit chip 1 includes a modulator 60. The modulator 60 may be a Mach-Zehnder Modulator (MZM), one end of which is optically coupled to the light source connection port 15, and the other end of which is optically coupled to the interleaver 50. Since the photonic integrated circuit chip 1 of the present disclosure has a single optical fiber bidirectional (BiDi) architecture, optical signals with different wavelengths are used in the upstream data transference mode and the downstream data transference mode, in some embodiments, an optical signal provided from the modulator 60 to the interleaver 50 is switched in the interleaver 50 to correspond to a correct port. For example, the optical transmitting signal 1270Tx with the wavelength of 1270 nm transmitted from the modulator 60 to the interleaver 50 will be guided by the interleaver 50 to the third connection port 13, the optical transmitting signal 1330Tx with the wavelength of 1330 nm transmitted from the modulator 60 to the interleaver 50 is guided by the interleaver 50 to the fourth connection port 14. In some embodiments, the modulator 60 is further optically coupled to the second connection port 12 to transmit the modulated optical transmitting signal 1310Tx with the wavelength of 1310 nm directly out of the photonic integrated circuit chip 1 via the second connection port 12, which acts as an optical path for transmitting a signal in the Duplex architecture.

The photonic integrated circuit chip 1 of the present disclosure belongs to a complementary metal oxide semiconductor (CMOS) chip, that is, through a CMOS process, the aforementioned structures or elements, such as polarization beam splitting structures, the photodetector structure, the interleaver, the modulator and the like, are integrated into a one chip, is a Silicon Photonic Integrated Circuit Chip (Si-PIC Chip), and realizes the function of receiving optical signals and transmitting optical signals via the five connection ports of the chip, that is, four connection ports for being coupled to the optical fibers and one connection port for being coupled to the laser source. On the other hand, the photonic integrated circuit chip 1 of the present disclosure has both the duplex architecture and the single optical fiber bidirectional (BiDi) architecture, that is, only the one chip is mounted on the user end or the server end, can the application of the two communication architectures be realized at the same time, it is not only applicable to a situation where two optical fibers are used for unidirectional transference, but also applicable to a situation where a single optical fiber is used for bidirectional transference, and it can decide which connection port is used to be coupled to the optical fiber according to a position of a mounted end point, not only wiring cost of the optical fiber communication network is reduced, but also flexibility of the wiring is improved, as for the manufacturing aspect, there is no need to fabricate different photonic integrated circuit chips for different functions or different architectures, production costs is significantly reduced.

Figure 2A:
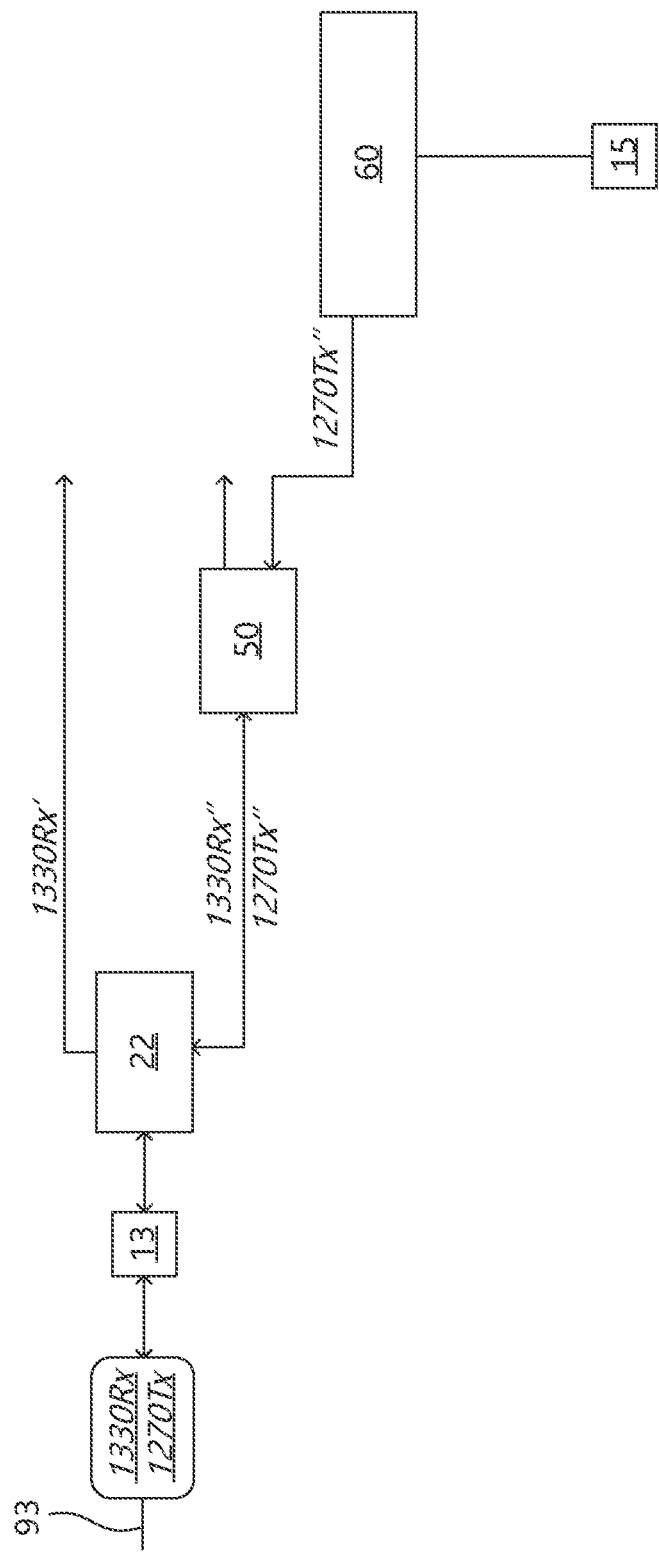
FIG. 2A is a partial schematic diagram of an architecture of a photonic integrated circuit chip according to an embodiment of the present disclosure, which is used to show a part of a single optical fiber bidirectional (BiDi) architecture.

FIG. 2A is a schematic diagram of receiving and transmitting optical signals in a single optical fiber bidirectional (BiDi) architecture according to some embodiments of the present disclosure. As shown in the figure, as for the third optical fiber 93 coupled to the third connection port 13, the optical receiving signal 1330Rx with the wavelength of 1330 nm received by the photonic integrated circuit chip 1 will be split into the transverse magnetic field mode optical receiving signal 1330Rx' and the transverse electric field mode optical receiving signal 1330Rx" through the polarization beam splitting structure 22, the modulator 60 modulates the laser source 95 into a transverse electric field mode optical transmitting signal 1270Tx" carrying an information via the light source connection port 15, the transverse electric field mode optical transmitting signal 1270Tx" the transverse electric field mode optical receiving signal 1330Rx" split by the polarization beam splitting structure 22 have different wavelengths and the same mode, so the interleaver 50 having the wavelength division multiplexing structure can receive the transverse electric field mode optical receiving signal 1330Rx" from the polarization beam splitting structure 22 and the transverse electric field mode optical transmitting signal 1270Tx" from the modulator 60, and further couple the transverse electric field mode optical receiving signal 1330Rx" and the transverse electric field mode optical transmitting signal 1270Tx" into optical signals sharing an optical path, so that the transverse electric field mode optical transmitting signal 1270Tx" passes through the optical coupling path between the interleaver 50 and the polarization beam splitting structure 22, then exits from the photonic integrated circuit chip 1 via the third connection port 13 and enters into the third optical fiber 93. Therefore, in some embodiments, the interleaver 50 of the photonic integrated circuit chip 1 of the present disclosure includes at least three ports: one port is used to receive an optical signal from the polarization beam splitting structure and process coupling between an upstream transference of an optical signal (such as the transverse electric field mode optical transmitting signal 1270Tx") and a downstream transference of an optical signal (such as the transverse electric field mode optical receiving signal 1330Rx"); one port further transmits the downstream transference of the optical signal to the photodetector structure 40; and one port receives the optical signal from the modulator 60 for the upstream transference.

Figure 2B:
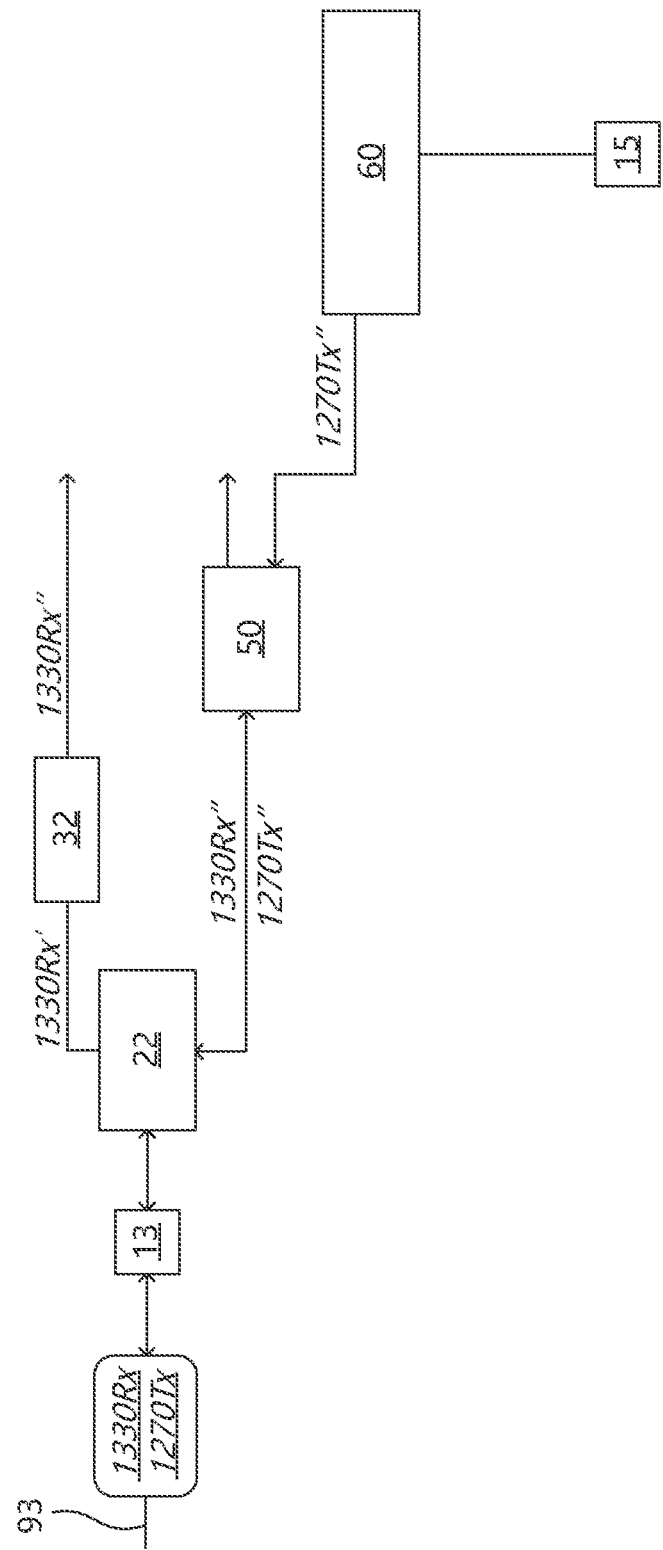
FIG. 2B is a partial schematic diagram of an architecture of a photonic integrated circuit chip according to an embodiment of the present disclosure, which is used to show a part of a single optical fiber bidirectional (BiDi) architecture including a polarization rotator structure.
Figure 2C:
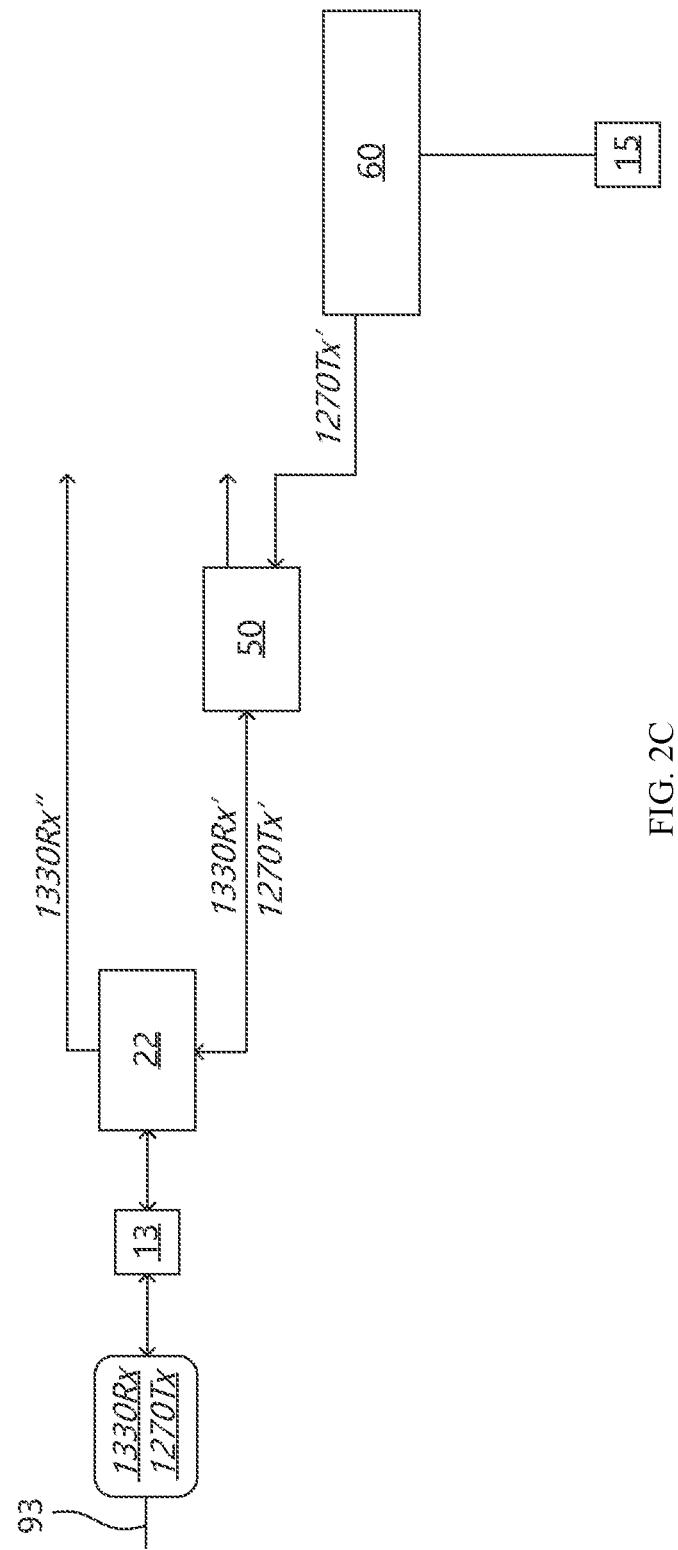
FIG. 2C is a partial schematic diagram of an architecture of a photonic integrated circuit chip according to an embodiment of the present disclosure, which is used to show a part of a single optical fiber bidirectional (BiDi) architecture with a transverse magnetic field mode as a main polarization mode.
Figure 2D:
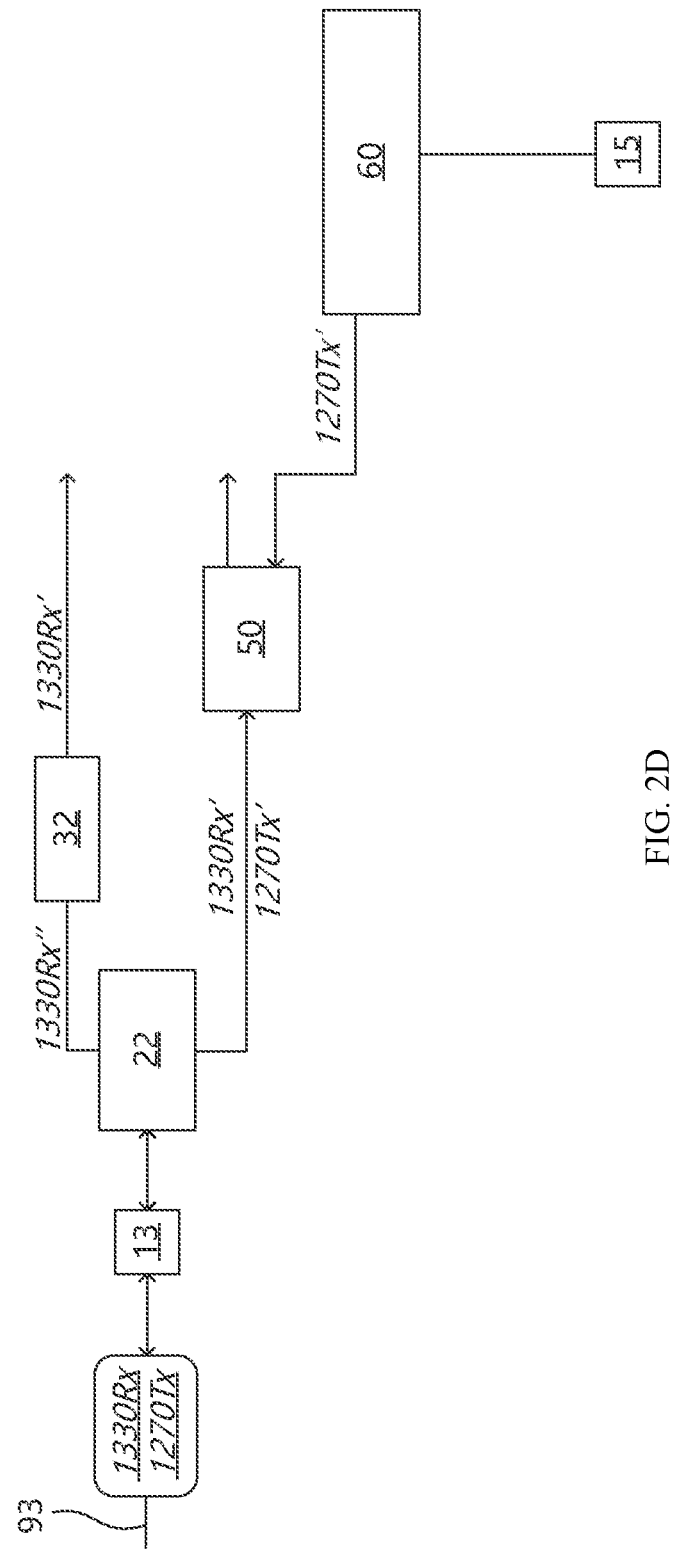
FIG. 2D is a partial schematic diagram of an architecture of a photonic integrated circuit chip according to an embodiment of the present disclosure, which is used to show a part of a single optical fiber bidirectional (BiDi) architecture including a polarization rotator structure with a transverse magnetic field mode as a main polarization mode.

As shown in FIG. 2B, in some embodiments, a polarization rotator structure 32 may be further included, the polarization rotator structure 32 is optically coupled to the polarization beam splitting structure 22, is used to rotate the transverse magnetic field mode optical receiving signal 1330Rx' into the transverse electric field mode optical receiving signal 1330Rx", that is, adjusts the two polarized optical signals split by the polarization beam splitting structure 22 to have the same mode. Corresponding to FIG. 2A and FIG. 2B, as shown in FIG. 2C and FIG. 2D, in some embodiments, the two polarized optical signals split by the polarization beam splitting structure 22 can also be adjusted to have another same mode, for example, the modulator 60 provides the transverse magnetic field mode optical transmitting signal 1270Tx' to the interleaver 50, and the polarization rotator structure 32 rotates the transverse electric field mode optical receiving signal 1330Rx" into the transverse magnetic field mode optical receiving signal 1330Rx'.

Figure 3:
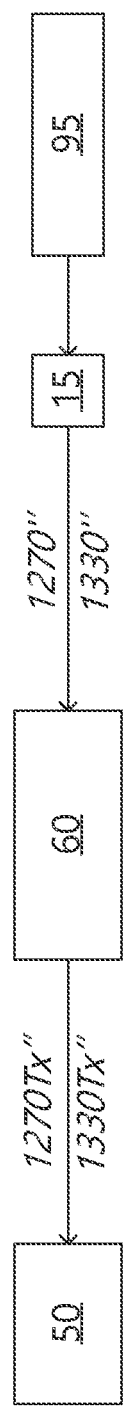
FIG. 3 is a partial schematic diagram of an architecture of a photonic integrated circuit chip according to an embodiment of the present disclosure, which is used to show a part of a single optical fiber bidirectional (BiDi) architecture, a light source can provide lasers with different wavelengths.

FIG. 3 discloses that, in a single optical fiber bidirectional (BiDi) architecture, some embodiments of the present disclosure provide optical signals of different wavelengths which can be generated lasers through a light source 95 to allow the photonic integrated circuit chip to transmit the optical signals of different wavelengths to corresponding optical fibers. As shown in the figure, in some embodiments, the light source 95 is coupled to the light source connection port 15 and provides a laser with a single mode to the modulator 60 via this path. In some embodiments, the light source 95 provides the transverse electric field mode laser 1270" with the wavelength of 1270 nm and the transverse electric field mode laser 1330" with the wavelength of 1330 nm to the modulator 60. In some embodiments, after the lasers are modulated, the lasers can be a transverse electric field mode optical transmitting signal 1270Tx" and a transverse electric field mode optical transmitting signal 1330Tx" with the above-mentioned specific wavelengths and carrying information, which are transmitted to the interleaver 50, then are coupled, next exit from the photonic integrated circuit chip, and are transmitted to the corresponding optical fibers coupled to the photonic integrated circuit chip.

Figure 4A:
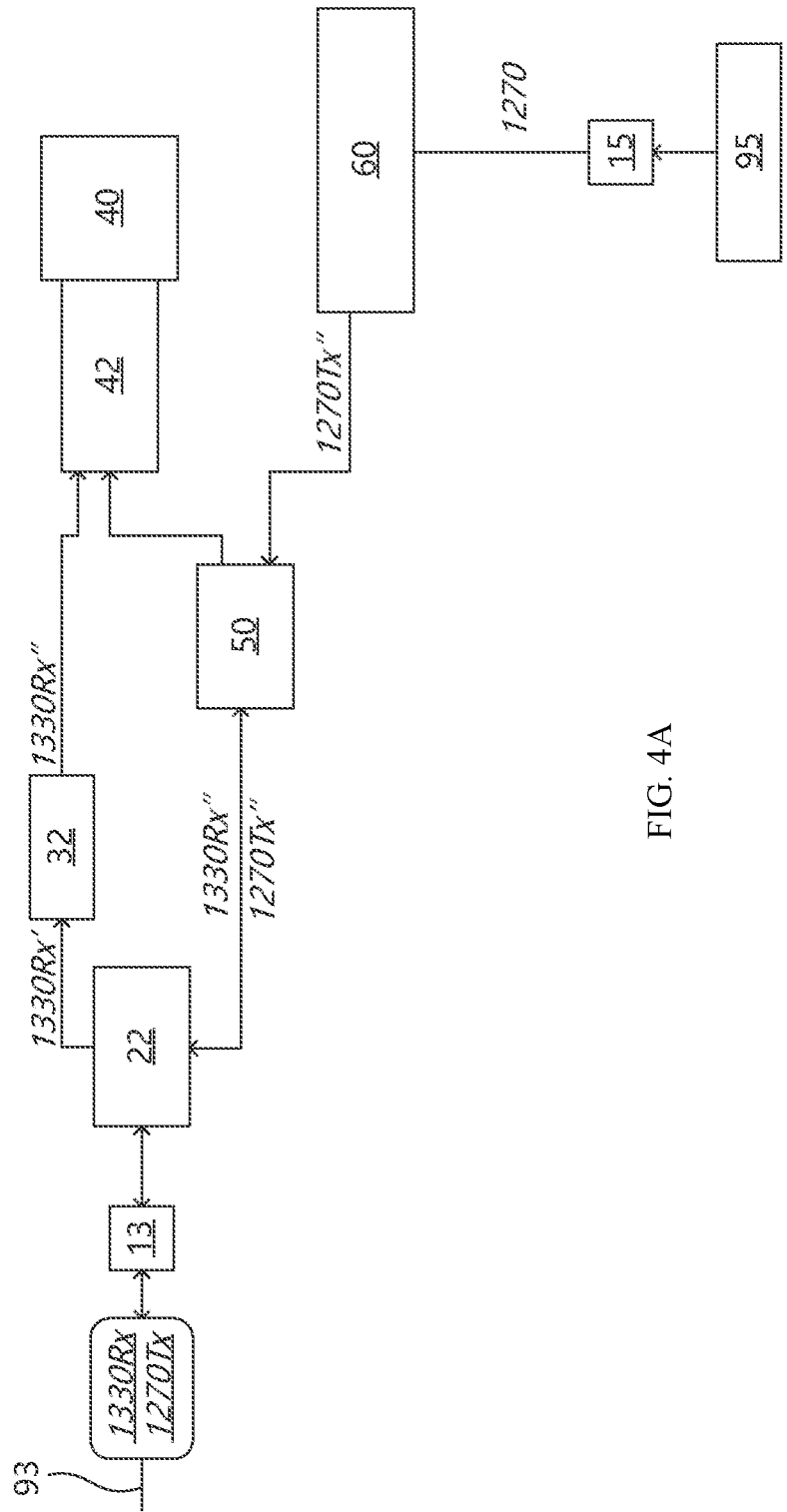
FIG. 4A is a partial schematic diagram of an architecture of a photonic integrated circuit chip according to an embodiment of the present disclosure, which is used to show an upstream data transference mode in a single optical fiber bidirectional (BiDi) architecture.
Figure 4B:
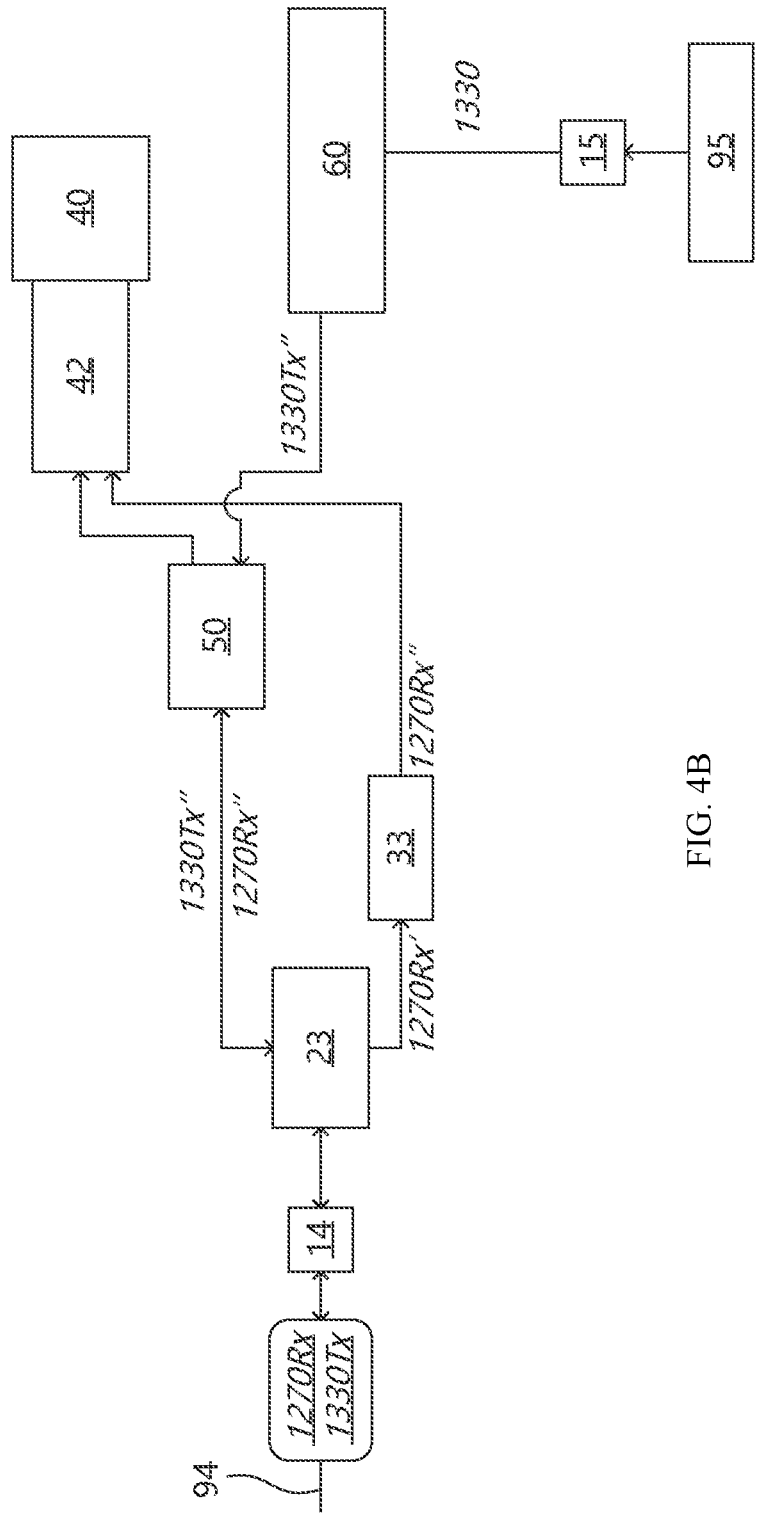
FIG. 4B is a partial schematic diagram of an architecture of a photonic integrated circuit chip according to an embodiment of the present disclosure, which is used to show a downstream data transference mode in a single optical fiber bidirectional (BiDi) architecture.

FIG. 4A and FIG. 4B disclose that, some embodiments of the present disclosure are applicable to the upstream data transference mode (FIG. 4A) and the downstream data transference mode (FIG. 4B) in a single optical fiber bidirectional (BiDi) architecture. In some embodiments, the light source 95 can provide lasers 1270, 1330 with different wavelengths, which are modulated by the modulator 60 to the transverse electric field mode optical transmitting signals 1270Tx", 1330Tx" with the above-mentioned specific wavelengths, and then the transverse electric field mode optical transmitting signals 1270Tx", 1330Tx" are transmitted to the interleaver 50, next by using the wavelength division multiplexing structure of the silicon-based filter structure of the interleaver 50, the transverse electric field mode optical transmitting signals 1270Tx", 1330Tx" are automatically guided to the polarization beam splitting structures 22, 23 on the optical paths respectively, then exit from the photonic integrated circuit chip 1 via the third connection port 13 and the fourth connection port 14 respectively and enter into the third optical fiber 93 and the fourth optical fiber 94 respectively. On the whole, a technical feature of the present disclosure is in that the interleaver 50 has a function of automatically guiding optical signals with different wavelengths to different optical paths, therefore, the photonic integrated circuit chip of the present disclosure can simultaneously realize the upstream data transference mode and the downstream data transference mode respectively corresponding to the third optical fiber 93 and the fourth optical fiber 94. In some embodiments, the lasers with the different wavelengths provided by the light source 95 can be realized by switching the light source 95, so that the upstream data transference mode of the third optical fiber 93 and the downstream data transference mode of the fourth optical fiber 94 can be easily switched.

Figure 5:
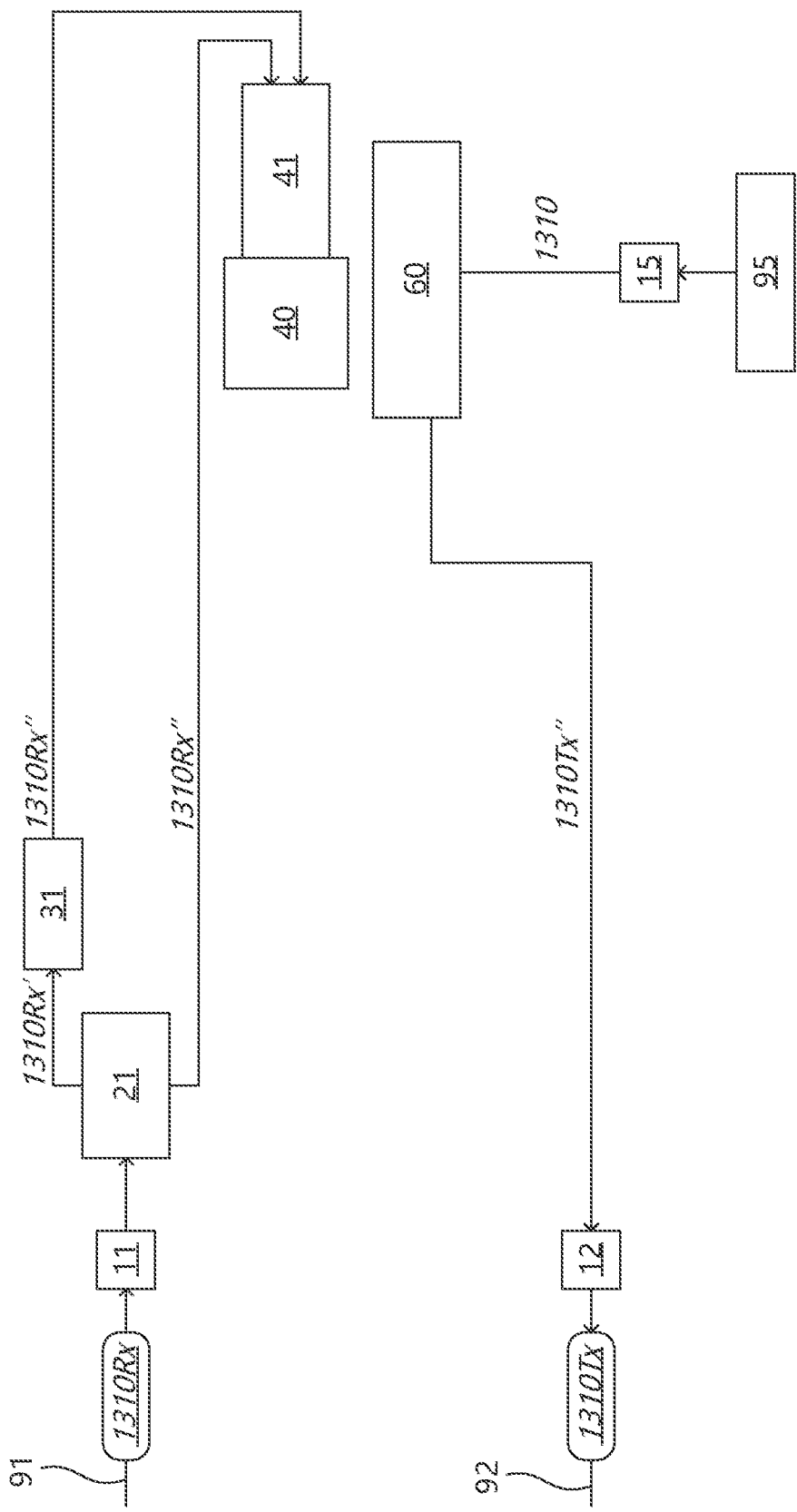
FIG. 5 is a partial schematic diagram of an architecture of a photonic integrated circuit chip according to an embodiment of the present disclosure, which is used to show an operation of a duplex architecture.

FIG. 5 discloses an operation of a duplex architecture of some embodiments of the present disclosure. In some embodiments, by using the photonic integrated circuit chip 1, the optical signal with a wavelength of 1310 nm is received and transmitted, and a polarization processing manner when the optical receiving signal 1310Rx with the wavelength of 1310 nm is received will not be repeated, as for transmission of the optical transmitting signal 1310Tx with the wavelength of 1310 nm, as shown in the figure, the light source 95 can provide a laser with a specific wavelength applicable to the duplex architecture, for example, a laser 1310 with a wavelength of 1310 nm, which is then modulated by the modulator 60 into a transverse electric field mode with a wavelength of 1310 nm, the optical transmitting signal 1310Tx" does not need to pass through the interleaver 50 of the aforementioned single optical fiber bidirectional (BiDi) architecture embodiment, but can directly exit from the photonic integrated circuit chip 1 via the second connection port 12 and enter into the second optical fiber 92.

The aforementioned contents generally describe the structures of the embodiments so that those skilled in the art can better understand the present disclosure. Those skilled in the art should understand that they can easily use the present disclosure as a basis for designing or modifying other processes and structures to carry out the same purpose and/or achieve the same advantages of the embodiments described herein. Those skilled in the art should also understand that these equivalent structures do not depart from the spirit and scope of the present disclosure, and they can make various changes, substitutions and alterations herein without departing from the spirit and scope of the present disclosure.

What is claimed is:

1. A photonic integrated circuit chip, comprising:
   a plurality of connection ports which are used to receive a plurality of first optical signals to the photonic integrated circuit chip;
   multiple polarization beam splitting structures, wherein each polarization beam splitting structure is optically coupled to a corresponding connection port, and each polarization beam splitting structure is used to split a first optical signal passing through each polarization beam splitting structure into a first mode optical signal and a second mode optical signal;
   a photodetector structure which comprises a first component and a second component, wherein the first component is optically coupled to a first polarization beam splitting structure, the second component is optical coupled to at least a second polarization beam splitting structure, the first component receives polarized optical signals split by the first polarization beam splitting structure, and the second component receives polarized optical signals split by the second polarization beam splitting structure;
   an interleaver which is optically coupled to the second component and is used to transfer a first mode optical signal split by a third polarization beam splitting structure or a second mode optical signal split by the second polarization beam splitting structure to the second component of the photodetector structure; and
   a modulator which is optically coupled to the interleaver and is used to transfer second optical signals with different wavelengths to the interleaver;
   wherein the interleaver further transfers second optical signals to different connection ports corresponding to the second and third polarization beam splitting structures according to different wavelengths of the second optical signals.

2. The photonic integrated circuit chip of claim 1, further comprising a light source connection port which is optically coupled to the modulator and is used to be coupled to a light source.

3. The photonic integrated circuit chip of claim 2, wherein the light source is used to provide lights with different wavelengths to the modulator to form the second optical signals.

4. The photonic integrated circuit chip of claim 1, wherein the plurality of connection ports comprises:
   a first connection port which is coupled to a first optical fiber;
   a second connection port which is coupled to a second optical fiber;
   a third connection port which is coupled to a third optical fiber; and
   a fourth connection port which is coupled to a fourth optical fiber.

5. The photonic integrated circuit chip of claim 4, wherein the first component and the second component are respectively positioned at two corresponding ends of the photodetector structure, and the first component is optically coupled to the first connection port, the second component is further optically coupled to the third connection port and the fourth connection port.

6. The photon integrated circuit chip of claim 5, wherein the first component has a 1×2 multimode interference optical coupling structure.

7. The photonic integrated circuit chip of claim 5, wherein the second component has a 1×3 multimode interference optical coupling structure.

8. The photonic integrated circuit chip of claim 5, wherein the multiple polarization beam splitting structures, the photodetector structure, the interleaver and the modulator are fabricated by a CMOS process.

9. The photonic integrated circuit chip of claim 1, wherein the interleaver has a wavelength division multiplexing structure.

10. The photonic integrated circuit chip of claim 1, further comprising multiple polarization rotator structures which are optically coupled to the multiple polarization beam splitting structures respectively and which each are used to rotate the first mode optical signal to have the same mode as the second mode optical signal.

11. A photonic integrated circuit chip, comprising:
    four optical fiber connection ports configured to be respectively coupled to four optical fibers to receive or transmit optical signals to the photonic integrated circuit chip;
    one light source connection port configured to be coupled to a light source to transmit a light from the light source to the photonic integrated circuit chip;
    multiple polarization beam splitting structures which are optically coupled to three of the four optical fibers via the optical fiber connection ports;
    one photodetector structure which is optically coupled to the multiple polarization beam splitting structures;
    an interleaver which is optically coupled to the photodetector structure; and
    a modulator which is optically coupled to the interleaver and is optically coupled to the light source via the light source connection port.

12. The photonic integrated circuit chip of claim 11, further comprising multiple polarization rotating structures which are optically coupled to the multiple polarization beam splitting structures respectively.

13. The photonic integrated circuit chip of claim 11, wherein when the at least one photodetector structure comprises a first component and a second component, wherein the first component is optically coupled to a first polarization beam splitting structure, the second component is optical coupled to at least a second polarization beam splitting structure, the first component receives polarized optical signals split by the first polarization beam splitting structure, and the second component receives polarized optical signals split by the second polarization beam splitting structure.

14. The photonic integrated circuit chip according to claim 13, wherein the first and second components each have a one×multiple multimode interference optical coupling structure.

15. The photonic integrated circuit chip of claim 11, wherein the four optical fiber connection ports comprises two optical fiber connection ports which each are used to be coupled to corresponding optical fiber for bidirectional transference.

16. The photonic integrated circuit chip of claim 15, wherein the interleaver comprises at least three ports which are respectively used to receive an optical signal from one of the multiple polarization beam splitting structures, transmit the optical signal to the photodetector structure and receive an optical signal from the modulator.

17. A photonic integrated circuit chip, comprising:
   a connection port which is coupled to an optical fiber for bidirectional transference;
   a polarization beam splitting structure which is optically coupled to the connection port, receives an optical receiving signal from the optical fiber via the connection port, and is used to split the optical receiving signal into a first mode optical receiving signal and a second mode optical receiving signal;
   an interleaver which has a wavelength division multiplexing structure, is optically coupled to the polarization beam splitting structure, and receives the first mode optical receiving signal or the second mode optical receiving signal; and
   a modulator which is optically coupled to the interleaver and transmits an optical transmitting signal to the interleaver, the optical transmitting signal and the first mode optical receiving signal or the second mode optical receiving signal received by the interleaver having different wavelengths and the same mode.

18. The photonic integrated circuit chip of claim 17, further comprising a polarization rotator structure which is optically coupled to the polarization beam splitting structure and is used to rotate the second mode optical receiving signal to have the same mode as the first mode optical receiving signal.

19. The photonic integrated circuit chip of claim 17, further comprising a light source which is optically coupled to the modulator and is used to provide lights with different wavelengths to the modulator to form the optical transmitting signals with the different wavelengths.

20. The photonic integrated circuit chip of claim 17, wherein the interleaver comprises three ports used to receive an optical signal from the polarization beam splitting structure, transmit the optical signal to a photodetector structure and receive an optical signal from the modulator.

* * * * *